(12) United States Patent
Fröse et al.

(10) Patent No.: US 8,882,193 B2
(45) Date of Patent: Nov. 11, 2014

(54) HEAD REST FOR A VEHICLE

(75) Inventors: Ernst-Otto Fröse, Solingen (DE); Thomas Dillinger, Wermelskirchen (DE); Alexander Hasler, Düsseldorf (DE)

(73) Assignee: Johnson Controls GmbH, Burscheid (DE)

( * ) Notice: Subject to any disclaimer, the term of this patent is extended or adjusted under 35 U.S.C. 154(b) by 1019 days.

(21) Appl. No.: 12/675,345

(22) PCT Filed: Aug. 27, 2008

(86) PCT No.: PCT/EP2008/007005
§ 371 (c)(1),
(2), (4) Date: Sep. 27, 2010

(87) PCT Pub. No.: WO2009/030408
PCT Pub. Date: Mar. 12, 2009

(65) Prior Publication Data
US 2011/0012399 A1    Jan. 20, 2011

(30) Foreign Application Priority Data
Aug. 31, 2007  (DE) .......................... 10 2007 041 520

(51) Int. Cl.
*B60N 2/42* (2006.01)
*B60N 2/48* (2006.01)
(52) U.S. Cl.
CPC .................................. *B60N 2/4885* (2013.01)
USPC ...... 297/216.12; 297/391; 297/406; 297/407; 297/409
(58) Field of Classification Search
USPC ...................... 297/391, 406, 407, 216.12, 409
See application file for complete search history.

(56) References Cited

U.S. PATENT DOCUMENTS 8,029,055 B2 * 10/2011 Hartlaub .................. 297/216.12

FOREIGN PATENT DOCUMENTS

| DE | 3900495 A1 | 7/1990 |
| DE | 19923909 A1 | 1/2000 |
| DE | 19941712 C1 | 10/2000 |
| DE | 102004016474 B3 | 8/2005 |
| DE | 102006001143 B3 | 4/2007 |
| JP | 63-071816 | 4/1988 |
| JP | 2007-530357 A | 11/2007 |
| WO | WO-2005/097545 A2 | 10/2005 |

OTHER PUBLICATIONS

International Search Report corresponding to PCT/EP2008/007005, dated Mar. 20, 2009, 3 pgs.
Japanese Office Action (with translation)as received in connection with Japanese application No. 2010-522240; dtd Jan. 22, 2013.

* cited by examiner

*Primary Examiner* — Laurie Cranmer
(74) *Attorney, Agent, or Firm* — Foley & Lardner LLP

(57) ABSTRACT

A head rest for a vehicle seat includes: at least one first section that is oriented towards the head of the seat occupant, a second section, and a third section, wherein the second section is arranged essentially between the first and third sections. In the event of an accident, the first section can be displaced in the direction of displacement, due to the effect of a relative displacement of the second section from a working position into a safety position in the direction of the head of the seat occupant. The relative movement of the sections is a rotation about an essentially parallel rotational axis in the direction of displacement. A mounting of the first section in relation to the second section is provided during the relative displacement about the rotational axis. The first section comprises a first bearing surface and the second section comprises a second bearing surface.

8 Claims, 9 Drawing Sheets

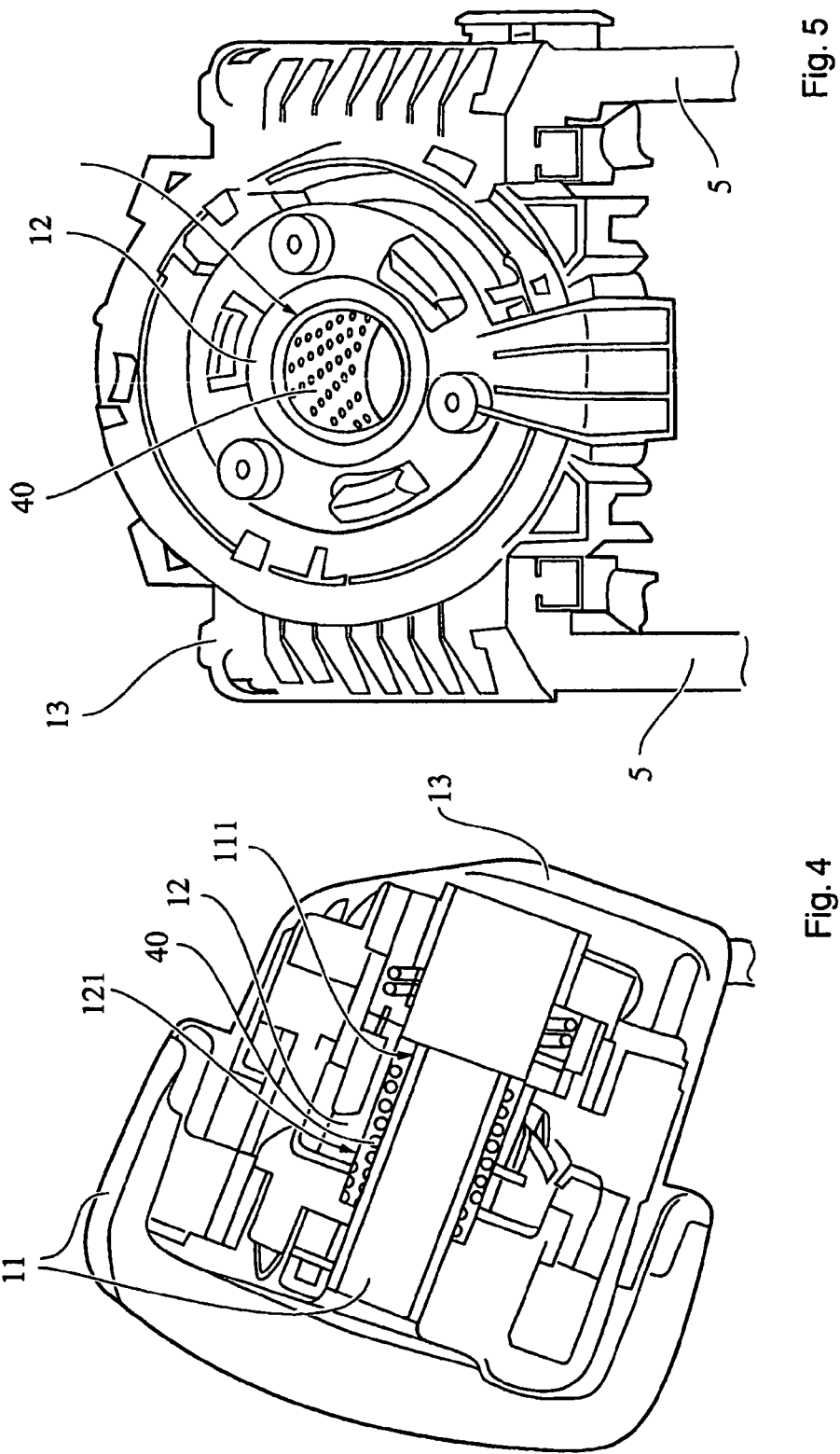

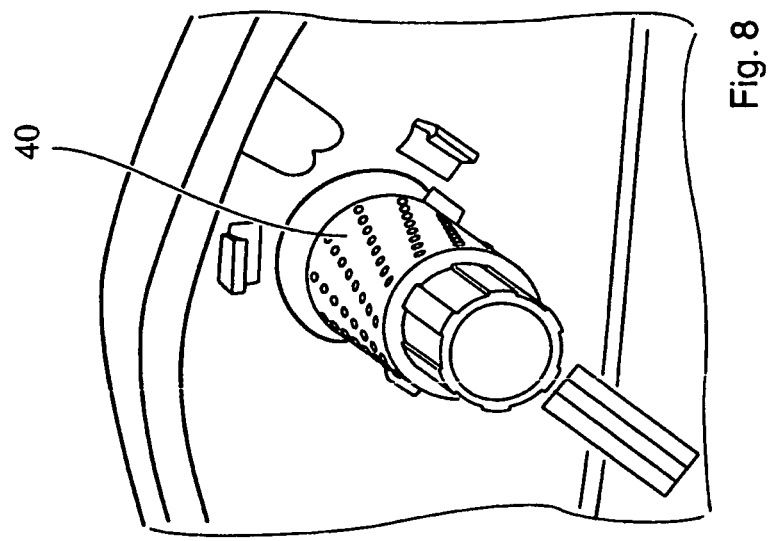
Fig. 8
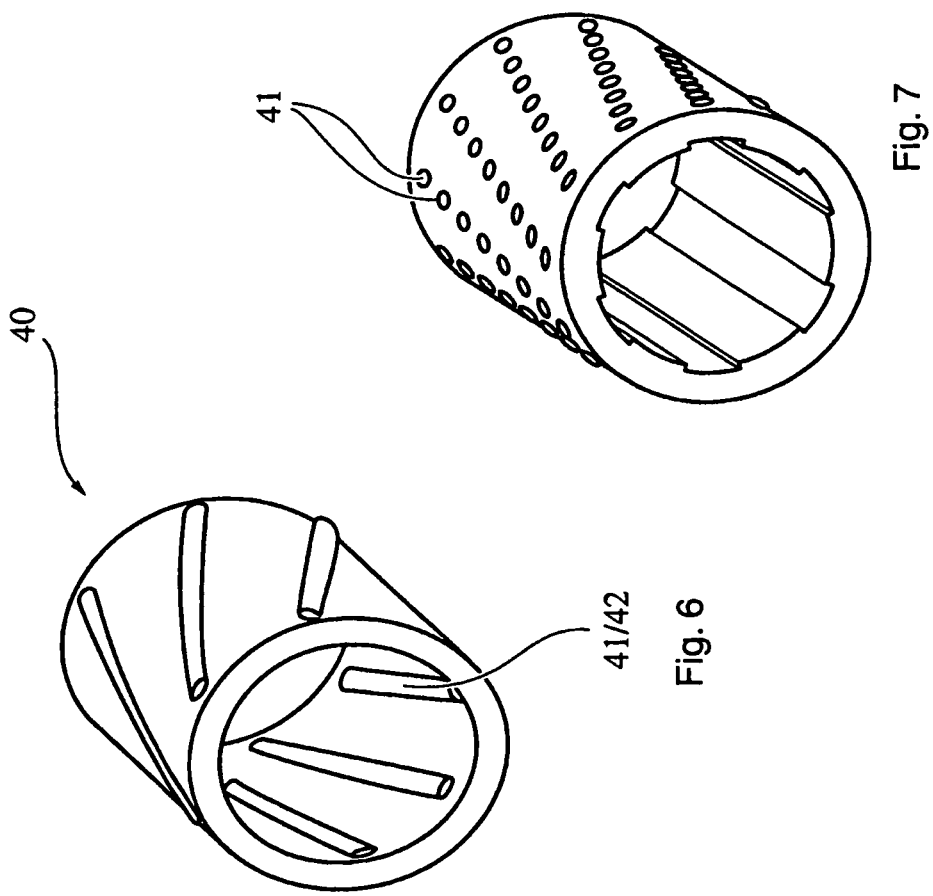
Fig. 7
Fig. 6

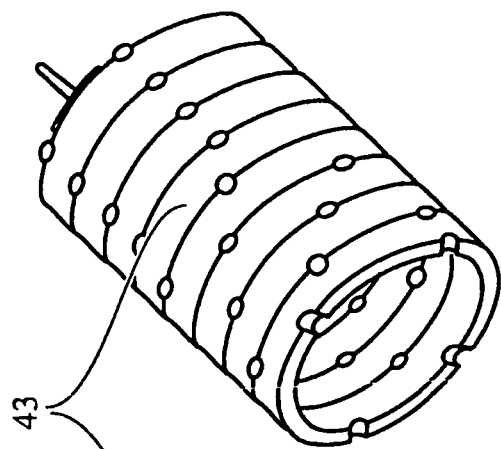
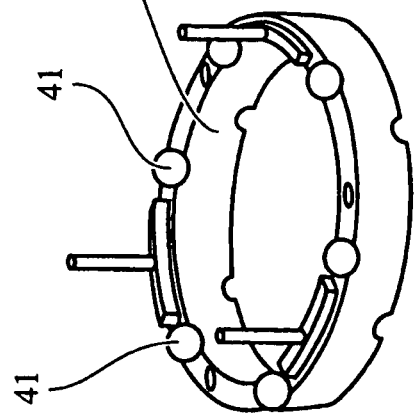
Fig. 14
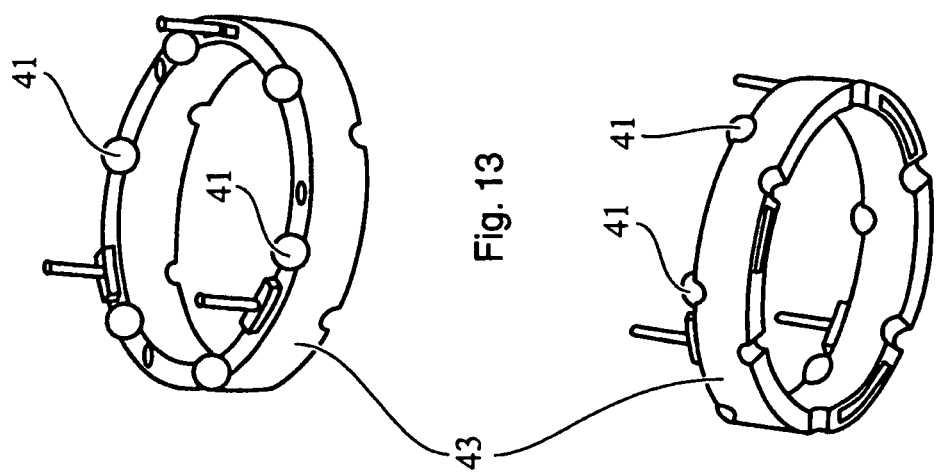
Fig. 13

US 8,882,193 B2

HEAD REST FOR A VEHICLE

CROSS-REFERENCE TO RELATED APPLICATIONS

This is a National Stage application of PCT/EP2008/007005, filed Aug. 27, 2008, which claims the benefit and priority of German Patent Application No. 10 2007 041 520.8, filed Aug. 31, 2007. The foregoing applications are incorporated by reference herein in their entirety.

The invention relates to a headrest for a vehicle seat in which, in the event of an accident, at least one section of the headrest that is oriented towards the head of the seat occupant may be displaced, due to the effect of a drive device, from a working position into a safety position in the direction of the head of the seat occupant.

PRIOR ART

A headrest is disclosed in the publication DE 199 23 909 A1, which consists of a base body rigidly connected to the backrest of the vehicle seat via retaining bars and optionally also in a height-adjustable manner, and which is arranged in a padded segment formed in a trough-like manner. In the event of an accident, the padded segment is moved in a translatory manner toward the head of the seat occupant in order to prevent whiplash. The force required therefor is produced by a spring pretensioned in the direction of displacement within a telescopic guide device. In the published patent specification DE 39 00 495 A1 a further headrest is disclosed in which, as a result of an accident, a padded segment may be pivoted forward relative to the base body about a fixed rotational axis. A spring-loaded piston/cylinder arrangement in conjunction with a supporting lever serves as a drive device in which the piston rod is articulated in the region of the rotational axis on the base body and the cylinder on the padded segment. Moreover, a headrest is further disclosed in the publication DE 199 41 712 C1, in which a displaceable padded element is connected to the base body via a scissors mechanism, by means of which the padded element may be moved forward from a resting position into a working position. A generic headrest is disclosed in the publication DE 10 2004 016 474 B3. In this case, sections of the headrest are moved apart in a telescopic manner, in order to adopt a safety position of the headrest.

SUMMARY

The object of the invention is to provide a headrest with a drive device which is of simple and compact design, smooth-running and effective.

The object is achieved by a headrest for a vehicle seat in which, in the event of an accident, at least one first section of the headrest that is oriented towards the head of the seat occupant may be displaced, due to the effect of a relative movement of a second section of the headrest that is arranged substantially between the first section and a third section, from a working position into a safety position in the direction of the head of the seat occupant in a direction of displacement, the relative movement of the sections being a rotation about a rotational axis substantially parallel to the direction of displacement, a mounting of the first section relative to the second section being provided during the relative movement about the rotational axis, and the first section comprising a first bearing surface and the second section comprising a second bearing surface. In this case, a particularly smooth-running implementation of a headrest according to the invention is possible. In particular it is possible, as a result, to simplify the mounting for the first section and to design said mounting for the first section to be considerably more smooth running.

According to the invention, it is preferred that in the region of the first and second bearing surfaces a rolling bearing is provided, the rolling bearing comprising, in particular, a bearing cage comprising a rolling element, and/or that the bearing cage along the rotational axis has a dimension in the order of magnitude of the displacement of the first section between the working position and the safety position. As a result, the particular smooth-running of the mounting, in particular of the first section relative to the second section, may be achieved in spite of the movement of the first section in the direction of displacement.

Furthermore, according to the invention it is preferred that the first section has at least one first oblique surface and the second section has at least one second oblique surface and/or that the third section has at least one third oblique surface and the second section has at least one fourth oblique surface, at least one portion of the oblique surfaces extending substantially helically about the rotational axis and, with a relative movement of the second section about the rotational axis, effect a movement of the first and/or second section in the direction of displacement. As a result, firstly a particularly effective transfer of the rotational movement of the second section into a translatory movement of the first section may be effected and, secondly, by the provision of two pairs of oblique surfaces (namely between the first section and the second section, on the one hand, and between the second section and the third section, on the other hand) with the same rotational angle of the rotational movement of the second section an increase in the translatory movement of the first section in the direction of displacement may be effected by an opposing arrangement of the pairs of oblique surfaces.

According to the invention, it is further preferred if the mounting of the first section relative to the second section is provided by means of a central mounting, the first bearing surface being an external bearing surface, the second bearing surface being an internal bearing surface and, in particular, the first and second bearing surfaces relative to the rotational axis being provided located radially on the inside relative to the first and second oblique surfaces and/or relative to the third and fourth oblique surfaces. As a result, a particularly stable movement of the headrest and/or of the parts of the headrest is possible, which is smooth-running in all operating modes and/or operating situations and thus corresponds to the safety requirements.

According to the present invention, it is further preferred that the first and second oblique surfaces act on both sides and/or the third and fourth oblique surfaces act on both sides. As a result, it is possible that a relatively well-defined rotational and/or rotational and translational adjustment of the second section of the headrest corresponds substantially to each translational adjustment of the first section of the headrest. In particular, as a result, it is possible according to the invention that the headrest may be returned again in a simple manner after activation (i.e. after the adjustment of the safety position).

According to the invention, it is further preferred if a blocking device is provided for blocking or reducing a movement of the first section of the headrest counter to the direction of displacement, the blocking device comprising teeth in the region of the third oblique surface and the fourth oblique surface. As a result, a possibility for blocking is provided in a simple yet reliable manner such that, after activating the safety mechanism of the headrest, the first section is no longer displaced or at least no longer displaced substantially back in the direction of the working position.

According to the invention, it is further preferred that the blocking device has at least one spring device, the spring device in the normal case effecting an engagement of the teeth and/or that the second section has a comfort section and a safety section, by means of a rotation of the comfort section about the rotational axis, starting from the working position or starting from a comfort position, a movement of the first section being provided in the direction of displacement, and by means of a rotation of the safety section about the rotational axis an at least partially combined movement of the comfort section and a movement of the first section being provided in the direction of displacement. As a result, it is possible according to the invention that a comfort adjustment of the headrest in the horizontal direction, i.e. a displacement of the first section in the direction of displacement is possible in a simple manner for the purposes of comfort.

BRIEF DESCRIPTION OF THE DRAWINGS

The figures represent by way of example and schematically various embodiments of the invention, in which:

FIGS. 3 to 16 show various embodiments and/or details of the headrest according to the invention.

DETAILED DESCRIPTION

Figure 1:
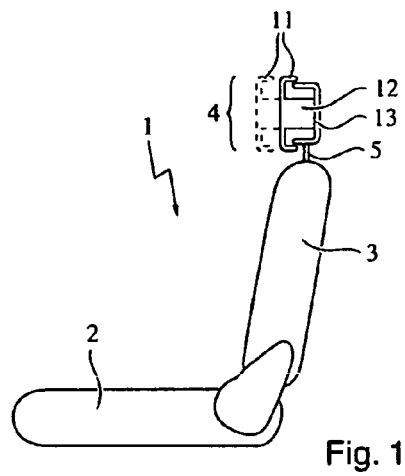
FIG. 1 shows a vehicle seat comprising a headrest.

According to FIG. 1, a vehicle seat 1 according to the invention and/or a vehicle seat 1 provided with a headrest 4 according to the invention comprises a seat part 2 and a backrest 3 connected thereto, in particular in a manner in which the inclination may be adjusted, and which is provided with the headrest 4. Pairs of retaining bars 5 may be provided for fastening the headrest to the backrest 3. However, alternatively other fastening options (not shown) may also be provided between the backrest 3 and the headrest 4. The pairs of retaining bars 5 of the headrest 4 may be connected pivotably in the upper region of the backrest or in the region of the headrest 4 via an articulation (not shown) to the backrest 3 and/or to the headrest 4. According to the invention, the headrest 4 comprises at least one first section 11 of the headrest 4 facing the head of the seat occupant, which as a result of an accident may be displaced under the action of a relative movement of a second section 12 of the headrest 4 arranged substantially between the first section 11 and a third section 13, from a working position (illustrated by solid lines in FIG. 1) toward the head of the seat occupant in a direction of displacement into a safety position (illustrated by dotted lines in FIG. 1). The first section 11 is, in particular, a padded element on which the head of the seat occupant may be rested and/or supported. The third section 13 of the headrest 4 is, in particular, a base body of the headrest 4, which is rigidly connected to the backrest 3 via the retaining bars 5 or also in a manner in which the height and/or inclination may be adjusted. A drive device, disclosed hereinafter in detail and comprising the second section 12, is arranged inside the headrest 4 between the first section 11 and the third section 13, which effects the displacement of the first section 11 in a direction of movement C towards the head of the seat occupant.

Figure 2A:
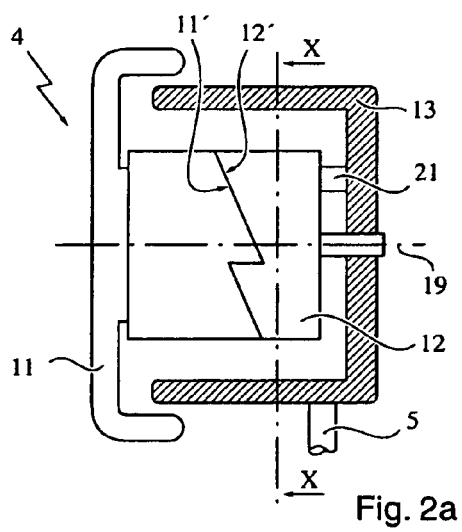
FIGS. 2a to 2d show sections through a drive device which may be inserted into the headrest in various operating positions according to one embodiment of the present invention.
Figure 2C:
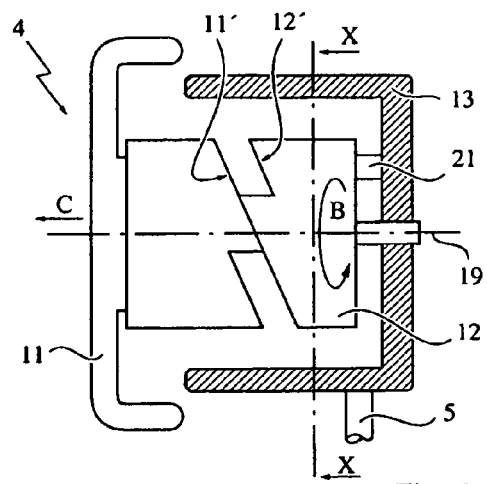
Figure 2B:
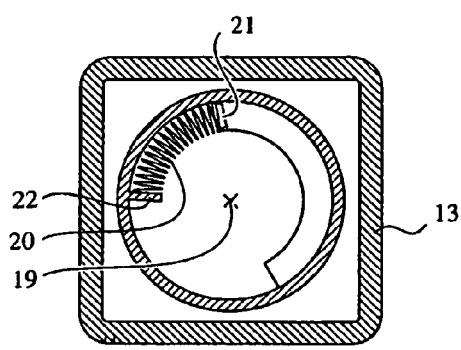
Figure 2D:
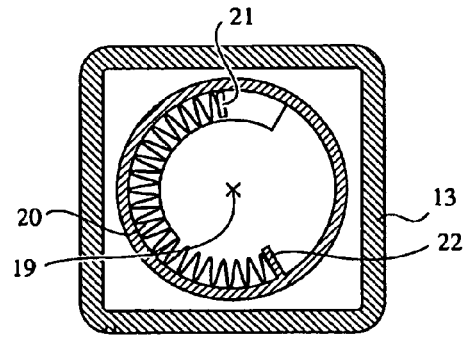
Figure 2E:
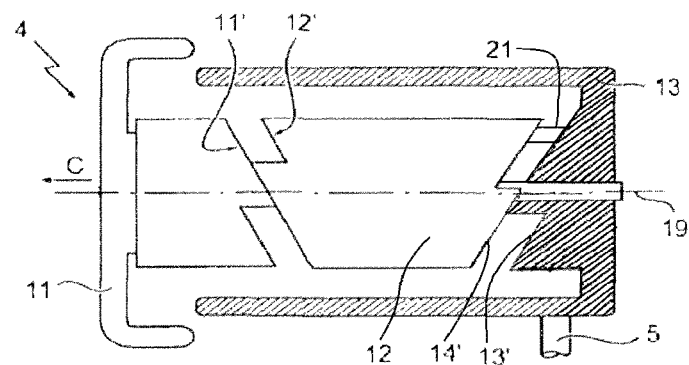
FIG. 2e shows sections through a drive device which may be inserted into the headrest according to another embodiment of the present invention.
Figure 2F:
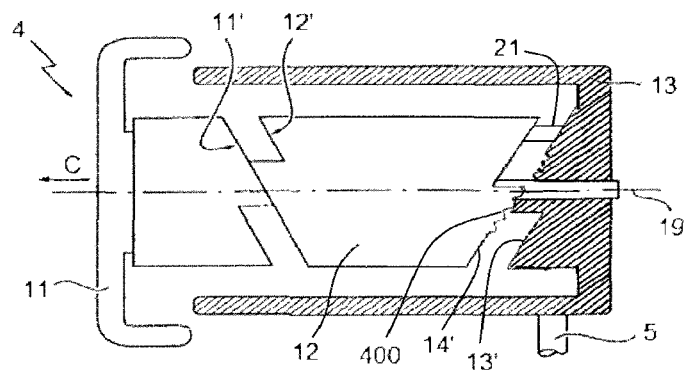
FIG. 2f shows sections through a drive device which may be inserted into the headrest according to another embodiment of the present invention.

According to FIGS. 2a to 2d, the relative movement of the sections 11, 12, 13 of the headrest 4 according to the invention is schematically shown in more detail. In this connection, FIGS. 2a and 2b show the state of the headrest in the working position and FIGS. 2c and 2d show the state of the headrest in the safety position (displacement of the first section 11 in the direction of the seat occupant, direction of movement C), FIG. 2b representing a front sectional view of the headrest 4 illustrated in FIG. 2a in a lateral sectional view along the cutting line X-X of FIG. 2a, and FIG. 2d representing a front sectional view of the headrest 4 illustrated in FIG. 2c in a lateral sectional view along the cutting line X-X of FIG. 2c. The drive device comprises the second section 12 of the headrest 4, which is connected to the third section 13 and/or base body of the headrest 4 in a rotatable manner about a rotational axis 19. A pretensioned spring 20, shown merely schematically, in the region between two contact points 21 and 22 is—depending on the pretensioning—either able to effect a movement from the working position into the safety position after releasing a locking device, not shown, or to effect a movement from the safety position into the working position. In the event of an accident (FIG. 2c, FIG. 2d) the second section 12 is rotated relative to the third section 13 (arrow B). Oblique surfaces rubbing against one another between the first section 11 and the second section 12 and/or between the second section 12 and the third section 13 produce, therefore, an axial force and a forward displacement of the first section 11 parallel to the direction of the rotational axis 19 in the direction of the arrow C (direction of displacement). The front faces of the first section 11 denoted by 11' (subsequently also denoted as first oblique surfaces 11') and/or of the second section 12 (subsequently also denoted as second oblique surfaces 12') are configured according to the invention as oblique surfaces such that the rotational movement of the second section 12 is transferred into a translational movement of the first section 11. According to the invention, a blocking device may be provided at this point (i.e. between the first and second oblique surfaces 11', 12') such that a portion or all of said first and second oblique surfaces 11', 12' are provided with—for example sawtooth-like—teeth, which permit a blocking of the first section 11 in its fully extended or partially extended position according to the direction of movement C, when a force acts on the first section 11 moving back said section into the working position (for example after or during an accident, starting from the head of the vehicle occupant). Third and fourth oblique surfaces (not shown in FIGS. 2a to 2d) may either alternatively or in addition to their arrangement between the first section 11 and the second section 12 be provided between the second section 12 and the third section 13, as shown in the embodiment of FIG. 2e. Alternatively, or in addition to the blocking device in the region of the first and second oblique surfaces 11', 12', the region of the third and fourth oblique surfaces 13' and 14' may have a blocking device 400 as shown in the embodiment of FIG. 2f. This blocking device 400 is of similar design as the one that can be between the first and second oblique surfaces 11' and 12'.

According to the present invention it is either possible that the displacement in the direction of displacement C of the first section 11 exclusively takes place in the case of an accident and thus beyond the working position only the safety position of the first section 11 is possible, or as an alternative it is possible that the displacement of the first section 11 in the direction of displacement C is possible not only in an accident situation but also for the purposes of comfort as desired by a user. According to the invention, it may be provided in this second alternative that, starting from the working position, the displacement path in the direction of displacement for the purposes of comfort and the displacement path for adjusting the safety position completely overlap or either the displacement path for the purposes of comfort is greater than it is for safety purposes or, in reverse, the displacement path for the purposes of comfort is shorter than for safety purposes. In the embodiment set forth below, the displacement of the first section 11 in the direction of displacement C is possible not only in an accident situation but also for the purposes of comfort as desired by a user, and the displacement path in the direction of displacement for the purposes of comfort and the displacement path for adjusting the safety position completely overlap. This may be implemented according to the invention, for example, such that the second section 12 has a comfort section 122 and a safety section 123, by means of a rotation of the comfort section 122 about the rotational axis 19 starting from the working position or starting from a comfort position a movement of the first section 11 being provided in the direction of displacement C, and by means of a rotation of the safety section 123 about the rotational axis 19 an at least partially combined movement of the comfort section and a movement of the first section 11 being provided in the direction of displacement C. For the sake of a simpler view, however, in FIGS. 2a to 2d neither the safety section 123 nor the comfort section 122 is shown individually.

Figure 3:
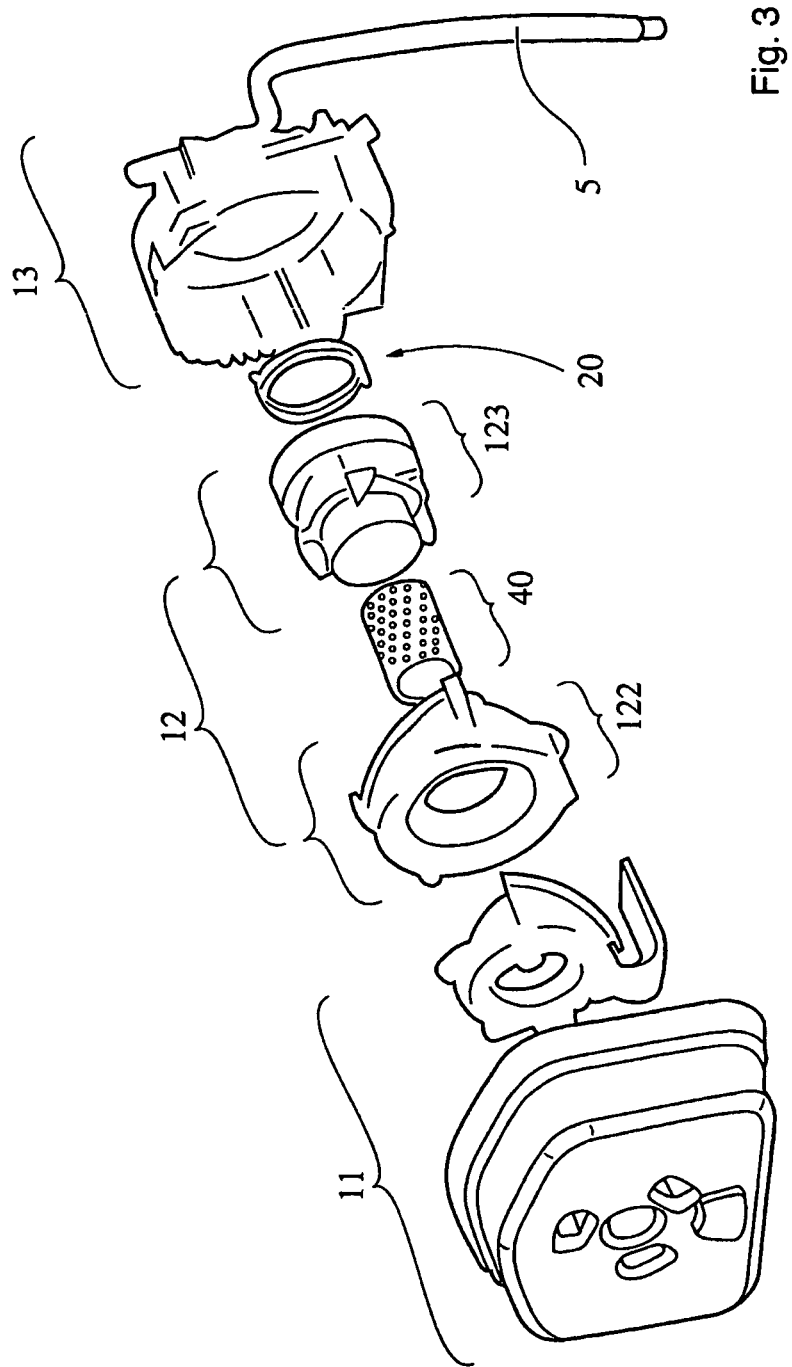
Figure 10:
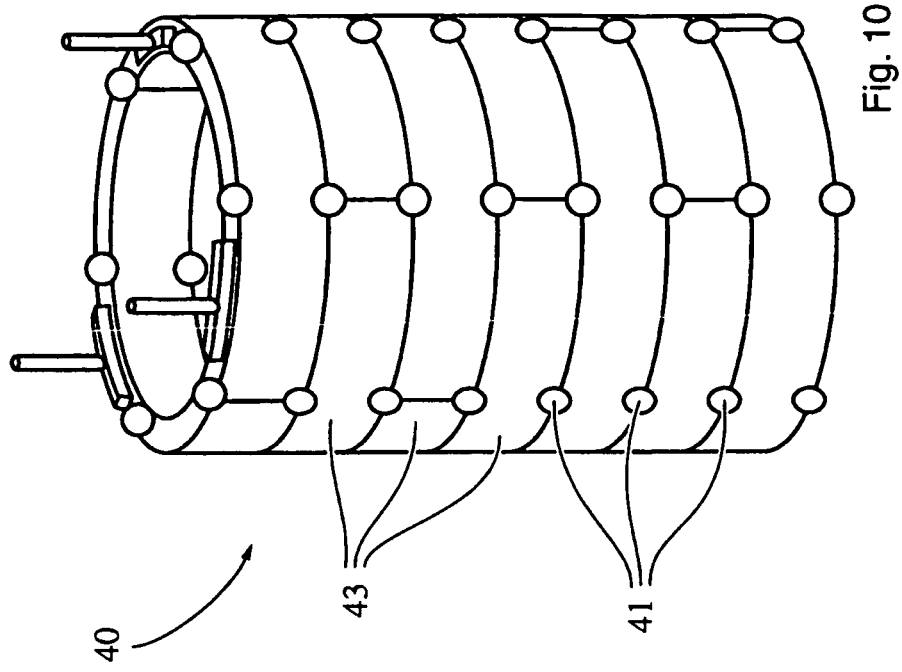
Figure 9:
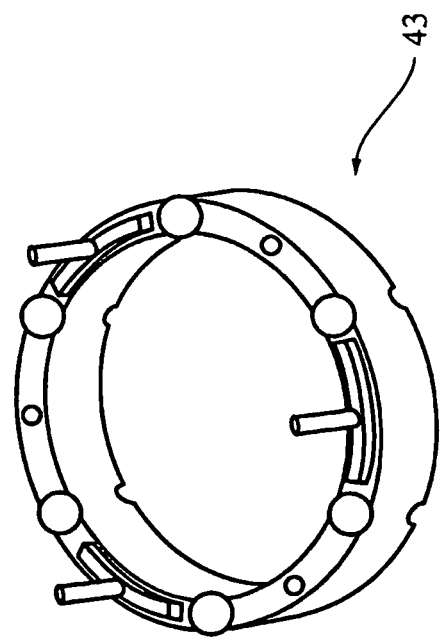
Figure 12:
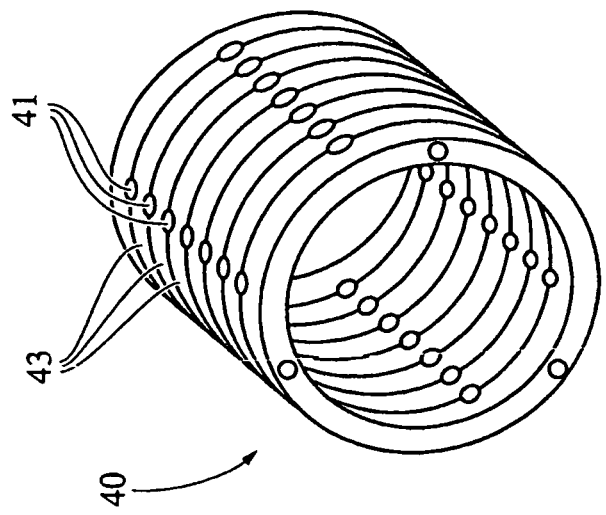
Figure 11:
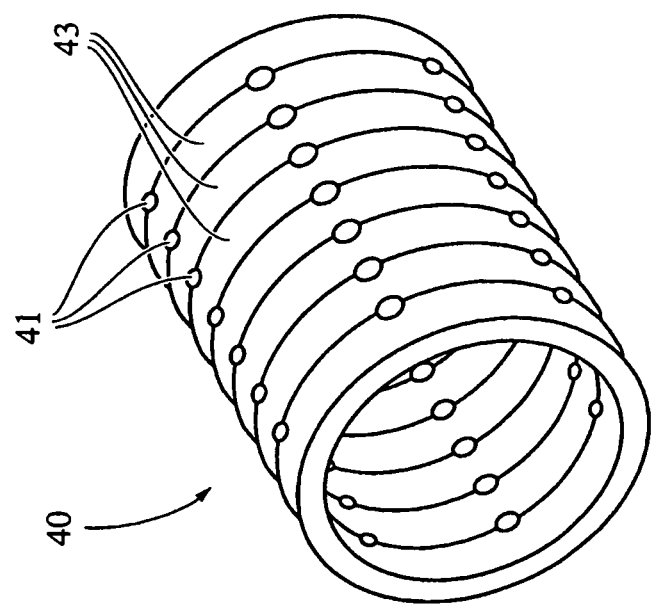
Figure 16:
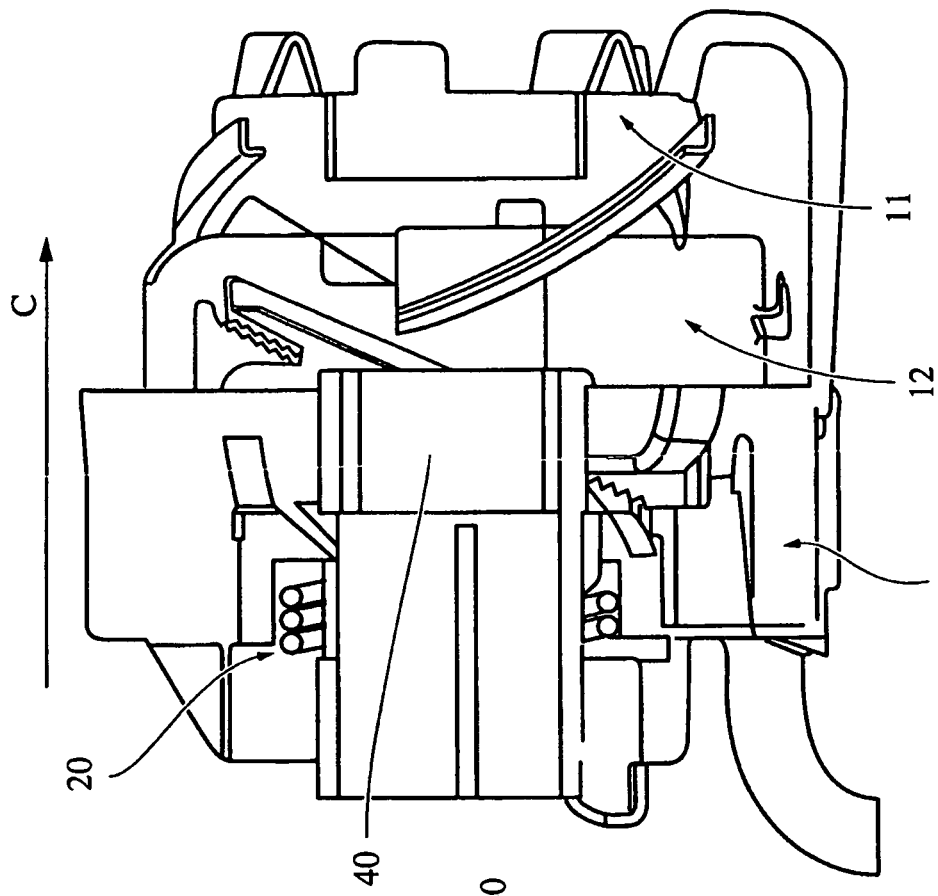
Figure 15:
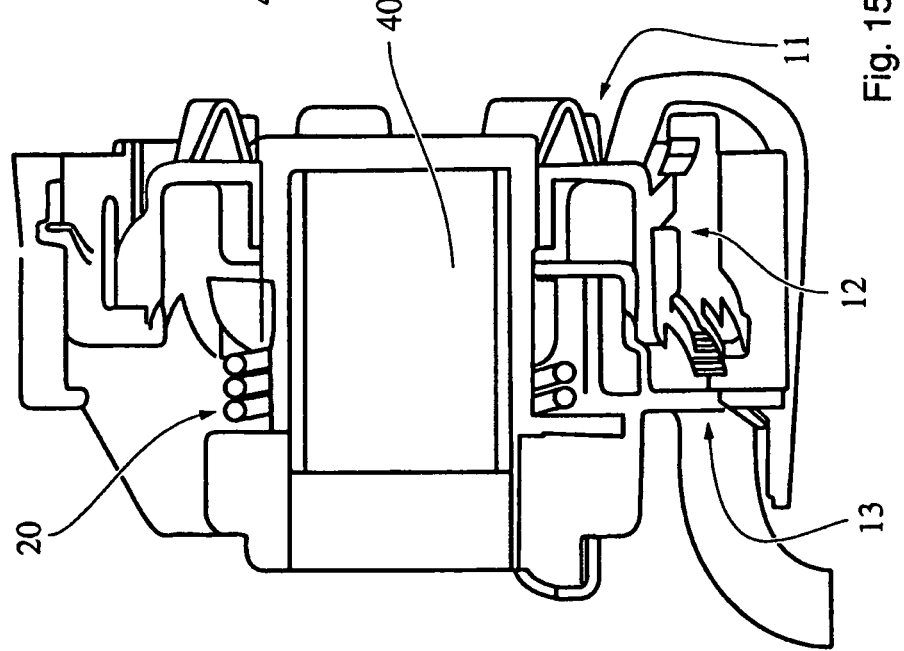

In FIGS. 3, 4, 5 as well as 15 and 16 various views of a headrest 4 according to the invention are shown schematically, in FIG. 3 an exploded view being shown, in FIG. 4 a sectional view being shown, in FIG. 5 a plan view being shown with the first section removed as well as in FIGS. 15 and 16 further sectional views of the headrest being shown in the working position (FIG. 15) and/or in the safety position (FIG. 16). The first section 11, the third section 13, the spring 20 configured as a leg spring 20, a bearing cage 40, the retaining bars 5 for the headrest 4 and the second section 12 with the comfort section 122 and the safety section 123 are shown in each case.

From FIGS. 3 to 5, as well as 15 and 16 it may be seen that the bearing cage 40 is arranged between the first section 11 and the second section 12 (and/or between the first section 11 and the comfort section 122 of the first section 12) and that the first section 11 has a tubular projection such that the outer surface of the tubular projection cooperates as a first bearing surface 111 with a tubular or cylindrical second bearing surface 121, in particular an internal surface of the second section 12 and/or of the comfort section 122 and/or with a corresponding side of the bearing cage 40 for mounting the first section 11 for the purpose of a central mounting. The length of the tubular projection and/or the length of the first bearing surface 111 is, according to the invention, dimensioned such that a sufficiently efficient and smooth-running mounting is ensured in all translational settings of the first section 11. In particular when using a bearing cage 40 (not necessarily having to be provided), said bearing cage 40 and/or the length thereof or dimension along the rotational axis 19 is dimensioned such that with all translational adjustments of the first section 11 a correct mounting is ensured. To this end, the bearing cage 40 preferably has a dimension in the range of the order of magnitude of displacement of the first section 11 between the working position and the safety position, preferably in the range of between 60% and 140%, preferably between 80% and 12%, the length of the maximum displacement path.

The bearing cage 40 according to the invention preferably has a plurality of rolling elements 41. Different examples of various embodiments of the bearing cage 40 are shown in FIGS. 6 to 14. In FIG. 6, an embodiment of the substantially cylindrical bearing cage 40 is shown, in which the bearing cage 40 is provided substantially in one piece and the rolling elements 41 are formed substantially as roller bearing elements 41. Alternatively or in addition to the presence of rolling elements 41, in the embodiment according to FIG. 6 it may also be provided that in the region of the first and/or second bearing surface 111, 121, sliding ribs 42 are formed in the bearing cage 40, which lead to a particularly smooth-running mounting. In FIG. 7, an embodiment of the bearing cage 40 is shown in which the bearing cage 40 is also provided substantially in one piece and the rolling elements 41 are formed substantially as spherical rolling elements. In FIG. 7, and also in FIG. 8, it is shown that the inside of the bearing cage 40 may be formed by means of a wedged profile, the tubular projection of the first section 11 cooperating with the internal profile of the bearing cage 40 fixedly in terms of rotation, such that the outside of the bearing cage 40 may be understood as the first bearing surface 111. The wedged profile of the bearing cage 40 may, as an alternative (but not shown), also be provided on the outside of the bearing cage. In FIGS. 9 to 14, various embodiments of the bearing cage 40 are shown in which the bearing cage 40 is provided constructed from a plurality of sub-components 43, rings in particular being provided as sub-components which receive the rolling elements 41 therebetween. In this case, the rolling elements 41 are formed substantially as spherical rolling elements.

LIST OF REFERENCE NUMERALS

1 Vehicle seat
2 Seat part
3 Backrest
4 Headrest
5 Retaining bar
11 First section of the headrest
11' First oblique surface
12 Second section of the headrest
12' Second oblique surface
13 Third section of the headrest
13' Third oblique surface
14' Fourth oblique surface
19 Rotational axis
20 Leg spring
21, 22 Contact points
40 Bearing cage
41 Rolling elements
42 Sliding ribs
43 Partial elements
111 First bearing surface
121 Second bearing surface
122 Comfort section
123 Safety section
Arrow B Rotational direction of the hollow cylinder
Arrow C Displacement of the padded body

The invention claimed is:
1. A headrest for a vehicle seat, comprising:
at least one first section that is oriented towards a head of a seat occupant;
a second section; and
a third section,
wherein the second section is arranged substantially between the first section and the third section, wherein, in an event of an accident, the at least one first section is configured to be displaceable in a direction of displacement, due to an effect of a relative movement of the second section from a working position into one of a safety position, a comfort position, and a combination thereof in a direction of the head of the seat occupant, wherein the relative movement of the second section is a rotation about a rotational axis substantially parallel to the direction of displacement, wherein a mounting of the first section relative to the second section is provided during the relative movement about the rotational axis, wherein the first section comprises a first bearing surface and the second section comprises a second bearing surface, wherein a rolling bearing is provided in a region of the first and second bearing surfaces, and wherein the rolling bearing comprises a bearing cage comprising a rolling element.

2. The headrest as claimed in claim 1, wherein the first section has at least one first oblique surface and the second section has at least one second oblique surface, wherein the first oblique surface, the second oblique surface, or a combination thereof extend substantially helically about the rotational axis, and wherein the first oblique surface, the second oblique surface, or the combination thereof, with the relative movement of the second section about the rotational axis, effect a movement of the first section in the direction of displacement.

3. A headrest for a vehicle seat, comprising:
at least one first section that is oriented towards a head of a seat occupant;
a second section; and
a third section,
wherein the second section is arranged substantially between the first section and the third section,
wherein, in an event of an accident, the at least one first section is configured to be displaceable in a direction of displacement, due to an effect of a relative movement of the second section from a working position into one of a safety position, a comfort position, and a combination thereof in a direction of the head of the seat occupant,
wherein the relative movement of the second section is a rotation about a rotational axis substantially parallel to the direction of displacement,
wherein a mounting of the first section relative to the second section is provided during the relative movement about the rotational axis,
wherein the first section comprises a first bearing surface and the second section comprises a second bearing surface,
wherein a bearing cage is provided in a region of the first and second bearing surfaces, and
wherein the bearing cage is along the rotational axis, and has a dimension on an order of magnitude of a displacement of the first section between the working position and the safety position.

4. A headrest for a vehicle seat, comprising:
at least one first section that is oriented towards a head of a seat occupant;
a second section; and
a third section,
wherein the second section is arranged substantially between the first section and the third section,
wherein, in an event of an accident, the at least one first section is configured to be displaceable in a direction of displacement, due to an effect of a relative movement of the second section from a working position into one of a safety position, a comfort position, and a combination thereof in a direction of the head of the seat occupant,
wherein the relative movement of the second section is a rotation about a rotational axis substantially parallel to the direction of displacement,
wherein a mounting of the first section relative to the second section is provided during the relative movement about the rotational axis,
wherein the first section comprises a first bearing surface and the second section comprises a second bearing surface,
wherein the third section has at least one third oblique surface and the second section has at least one fourth oblique surface,
wherein the third oblique surface, the fourth oblique surface, or a combination thereof extends substantially helically about the rotational axis, and, with the relative movement of the second section about the rotational axis effect a movement of the second section in the direction of displacement.

5. A headrest for a vehicle seat, comprising:
at least one first section that is oriented towards a head of a seat occupant;
a second section; and
a third section,
wherein the second section is arranged substantially between the first section and the third section,
wherein, in an event of an accident, the at least one first section is configured to be displaceable in a direction of displacement, due to an effect of a relative movement of the second section from a working position into one of a safety position, a comfort position, and a combination thereof in a direction of the head of the seat occupant,
wherein the relative movement of the second section is a rotation about a rotational axis substantially parallel to the direction of displacement,
wherein a mounting of the first section relative to the second section is provided during the relative movement about the rotational axis,
wherein the first section comprises a first bearing surface and the second section comprises a second bearing surface,
wherein the first section has at least one first oblique surface and the second section has at least one second oblique surface,
wherein the third section has at least one third oblique surface and the second section has at least one fourth oblique surface,
wherein the mounting of the first section relative to the second section is provided by a central mounting, the first bearing surface being an external bearing surface, and the second bearing surface being an internal bearing surface, and
wherein the first and second bearing surfaces are located radially on an inside relative to the first and second oblique surfaces, relative to the third and fourth oblique surfaces, or relative to the first through fourth oblique surfaces.

6. The headrest as claimed in claim 5, wherein the first and second oblique surfaces act on each other, the third and fourth oblique surfaces act on each other, or a combination thereof.

7. A headrest for a vehicle seat, comprising:
at least one first section that is oriented towards a head of a seat occupant;
a second section; and
a third section, wherein the second section is arranged substantially between the first section and the third section, wherein in an event of an accident the at least one first section is configured to be displaceable in a direction of displacement, due to an effect of a relative movement of the second section from a working position into one of a safety position, a comfort position, and a combination thereof in a direction of the head of the seat occupant, wherein the relative movement of the second section is a rotation about a rotational axis substantially parallel to the direction of displacement, wherein a mounting of the first section relative to the second section is provided during the relative movement about the rotational axis, wherein the first section comprises a first bearing surface and the second section comprises a second bearing surface, wherein the third section has at least one third oblique surface and the second section has at least one fourth oblique surface, wherein a blocking device is provided for blocking or reducing a movement of the first section counter to the direction of displacement, and wherein the blocking device comprises teeth in a region of the third oblique surface and the fourth oblique surface.

8. A headrest for a vehicle seat, comprising:
at least one first section that is oriented towards a head of a seat occupant;
a second section; and
a third section,
wherein the second section is arranged substantially between the first section and the third section, wherein, in an event of an accident, the at least one first section is configured to be displaceable in a direction of displacement, due to an effect of a relative movement of the second section from a working position into one of a safety position, a comfort position, and a combination thereof in a direction of the head of the seat occupant, wherein the relative movement of the second section is a rotation about a rotational axis substantially parallel to the direction of displacement, wherein a mounting of the first section relative to the second section is provided during the relative movement about the rotational axis, wherein the first section comprises a first bearing surface and the second section comprises a second bearing surface, wherein the second section has a comfort section and a safety section, wherein, by a rotation of the comfort section about the rotational axis, starting from the working position or starting from the comfort position, a movement of the first section is provided in the direction of displacement and wherein, by a rotation of the safety section about the rotational axis, an at least partially combined movement of the comfort section and the first section is provided in the direction of displacement.

* * * * *